United States Patent Office.

N. A. BÜHLE, OF NEW YORK, N. Y.

IMPROVED COMPOSITION FOR GRINDING AND POLISHING.

Specification forming part of Letters Patent No. 56,896, dated August 7, 1866.

*To all whom it may concern:*

Be it known that I, N. A. BÜHLE, of the city, county, and State of New York, have invented a new and Improved Compound for Grinding and Polishing; and I do hereby declare that the following is a full, clear, and exact description thereof, which will enable others skilled in the art to make and use the same.

This invention relates to a compound which, when formed in rollers or bars, can be used with great advantage for grinding and polishing articles of metal of any desired description.

My compound is made of blood from which all watery parts have been removed and of linseed-oil to which emery, tripoli, pumice-stone, sand, or other grinding or polishing material of any desired description is added.

The proportion in which I mix these ingredients together is about as follows: Emery or other suitable grinding or polishing material, ten parts; blood, five parts; linseed-oil, three parts.

The blood is taken fresh, and after letting it stand for about two hours it is poured on a fine sieve, whereby all the watery parts are separated. The linseed-oil is boiled. The three ingredients are put in a vessel and ground together until they are intimately mixed and a loose paste is obtained, which is exposed for about forty-eight hours to the open atmosphere. At the end of that time the mixture is again ground, and then it becomes hard and plastic, so that it can be brought in any desirable form. Suitable iron molds serve to reduce the compound to the required shape, said molds being so constructed that the compound can be exposed to a heavy pressure, whereby the moisture is expelled; and after removing the compound from the molds it is dried first in the atmosphere for about ninety-six hours, and finally baked in an oven at a temperature of 240° to 250°. When cold it is ready for use.

Having thus described my invention, I claim as new and desire to secure by Letters Patent—

A compound for grinding and polishing, made as herein set forth.

The above specification of my invention signed by me this 23d day of June, 1866.

N. A. BÜHLE.

Witnesses:
 WM. F. MCNAMARA,
 W. HAUFF.